(12) United States Patent
Tanaka et al.

(10) Patent No.: US 9,638,125 B2
(45) Date of Patent: May 2, 2017

(54) CONTROL SYSTEM OF ENGINE

(71) Applicant: Mazda Motor Corporation, Aki-gun, Hiroshima (JP)

(72) Inventors: Kazuaki Tanaka, Higashihiroshima (JP); Yuusou Sakamoto, Iwakuni (JP); Hiroshi Tsuboi, Yokohama (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 15/008,961

(22) Filed: Jan. 28, 2016

(65) Prior Publication Data

US 2016/0237926 A1 Aug. 18, 2016

(30) Foreign Application Priority Data

Feb. 12, 2015 (JP) ................................. 2015-025207

(51) Int. Cl.
| | |
|---|---|
| *F01N 3/00* | (2006.01) |
| *F02D 41/14* | (2006.01) |
| *F01N 11/00* | (2006.01) |
| *F02D 41/02* | (2006.01) |
| *F02D 41/00* | (2006.01) |

(Continued)

(52) U.S. Cl.
CPC ........ *F02D 41/1454* (2013.01); *F01N 11/007* (2013.01); *F02D 41/0037* (2013.01); *F02D 41/0235* (2013.01); *F02D 41/126* (2013.01); *F01N 2430/06* (2013.01); *F01N 2550/02* (2013.01); *F01N 2560/025* (2013.01); *F01N 2610/03* (2013.01); *F01N 2610/06* (2013.01); *F02D 41/123* (2013.01);

(Continued)

(58) Field of Classification Search
CPC ............... F01N 11/007; F01N 2550/02; F01N 2560/025; F01N 2610/03; F01N 2610/06; F02D 41/0037; F02D 41/0235; F02D 41/123; F02D 41/126; F02D 41/1454; F02M 25/0854; Y02T 10/47
USPC .................................. 60/276, 277, 285, 299
See application file for complete search history.

(56) References Cited

U.S. PATENT DOCUMENTS

| | | | | |
|---|---|---|---|---|
| 5,228,286 A | * | 7/1993 | Demura | .................... F01N 3/22 60/277 |
| 5,636,514 A | * | 6/1997 | Seki | ...................... F01N 11/007 60/277 |

(Continued)

FOREIGN PATENT DOCUMENTS

JP 2007198210 A 8/2007

*Primary Examiner* — Thai Ba Trieu
*Assistant Examiner* — Diem Tran
(74) *Attorney, Agent, or Firm* — Alleman Hall McCoy Russell & Tuttle LLP

(57) ABSTRACT

A control system of an engine is provided. The control system includes a deceleration fuel cutoff module for performing a deceleration fuel cutoff when a deceleration fuel cutoff condition is satisfied in an engine decelerating state, a purge unit for purging by supplying a purge gas to an intake passage during the deceleration fuel cutoff, an exhaust emission control catalyst provided in an exhaust passage, an $O_2$ sensor provided at a position of the exhaust passage downstream of the exhaust emission control catalyst, an abnormality determining module for determining an abnormality of the exhaust emission control catalyst, and a purge restricting module for restricting the purge during an immediately previous deceleration fuel cutoff.

7 Claims, 8 Drawing Sheets

(51) Int. Cl.
  *F02D 41/12*    (2006.01)
  *F02M 25/08*    (2006.01)
(52) U.S. Cl.
  CPC .  *F02D 2200/0814* (2013.01); *F02M 25/0854* (2013.01); *Y02T 10/47* (2013.01)

(56) References Cited

U.S. PATENT DOCUMENTS

| | | | | |
|---|---|---|---|---|
| 5,713,199 | A | * | 2/1998 | Takeshima ......... B01D 53/9495 60/276 |
| 5,743,086 | A | * | 4/1998 | Nagai ................... F01N 11/007 60/276 |
| 5,795,992 | A | * | 8/1998 | Tanahashi ............. F01N 11/002 60/276 |
| 6,021,638 | A | * | 2/2000 | Hochmuth ............ F01N 3/0842 123/326 |
| 2012/0253642 | A1 | * | 10/2012 | Kitano ................ F02D 41/0085 701/104 |

\* cited by examiner

CONTROL SYSTEM OF ENGINE

BACKGROUND

The present invention relates to a technical field of a control system of an engine in which a purge gas containing evaporated fuel desorbed from a canister is supplied to an intake passage.

Conventionally, arts are known in which when it is determined that evaporated fuel easily overflows from a canister during a deceleration fuel cutoff of the engine, the purge gas containing the evaporated fuel desorbed from the canister is supplied to an intake passage of the engine. For example, JP2007-198210A discloses such an art. By supplying the purge gas to the intake passage during the deceleration fuel cutoff as above, the overflow of the evaporated fuel from the canister can be suppressed. Although the evaporated fuel within the purge gas supplied to the intake passage will be discharged unburned to an exhaust passage through the engine, the unburned evaporated fuel can be purified by an exhaust emission control catalyst provided in the exhaust passage.

Further, in JP2007-198210A, a linear $O_2$ sensor for detecting an oxygen concentration within exhaust gas for the purpose of performing a feedback control of an air-fuel ratio within a combustion chamber is provided upstream of the exhaust emission control catalyst, and an $O_2$ sensor is provided downstream of the exhaust emission control catalyst.

Meanwhile, the $O_2$ sensor located downstream of the exhaust emission control catalyst is normally for detecting whether a state of the air-fuel ratio of the exhaust gas is stoichiometric, rich, or lean. When the air-fuel ratio is stoichiometric or rich, an output value (output voltage) of the $O_2$ sensor indicates a first voltage (e.g., approximately 1V), and when the air-fuel ratio is lean, the output value indicates a second voltage (e.g., approximately 0V) which is lower than the first voltage. The $O_2$ sensor can be used for an abnormality determination in which it is determined whether the exhaust emission control catalyst is abnormal (whether it is deteriorated).

Specifically, during the deceleration fuel cutoff, oxygen is stored in the exhaust emission control catalyst, and normally during the deceleration fuel cutoff, the exhaust emission control catalyst reaches an oxygen-saturated state where oxygen cannot be stored anymore. A stored oxygen amount in the oxygen-saturated state (hereinafter, referred to as "the saturated oxygen amount") is determined based on a volume of the exhaust emission control catalyst. Further, during the deceleration fuel cutoff, the output value of the $O_2$ sensor indicates the second voltage.

When the operation of the engine is shifted from the deceleration fuel cutoff to a normal operation (an operation in which an injector supplies fuel to the engine and the fuel is combusted), the abnormality determination is performed. Here, a rich operation of the engine is performed. In other words, the fuel is injected by the injector so that the air-fuel ratio within the combustion chamber becomes richer than stoichiometric. An amount of excess fuel with respect to a stoichiometric amount in the injected fuel is oxidized and purified by the oxygen stored in the exhaust emission control catalyst. Therefore, as the rich operation proceeds, the oxygen stored in the exhaust emission control catalyst is consumed and the stored oxygen amount therein gradually reduces and eventually becomes zero. When the stored oxygen amount in the exhaust emission control catalyst becomes zero as above, the excess fuel cannot be purified by the exhaust emission control catalyst and the output value of the $O_2$ sensor sharply changes from the second voltage to the first voltage. During a period from the shift of the engine operation, from the deceleration fuel cutoff to the normal operation, until the output value of the $O_2$ sensor changes at least by a predetermined value, an integration value of the excess fuel amount is calculated. A final integration value, finally calculated when the change of the output value of the $O_2$ sensor exceeds the predetermined value, indicates a total amount of excess fuel in the period from the shift of the engine operation to the change of the output value and corresponds to a stored oxygen amount in the exhaust emission control catalyst when the operation of the engine is shifted from the deceleration fuel cutoff to the normal operation (normally the saturated oxygen amount).

Here, if an abnormality of the exhaust emission control catalyst occurs due to, for example, deterioration, a largest storable oxygen amount in the exhaust emission control catalyst decreases below the saturated oxygen amount, and thus, the stored oxygen amount in the exhaust emission control catalyst when the operation of the engine is shifted from the deceleration fuel cutoff to the normal operation becomes lower than the saturated oxygen amount. Accordingly, the final integration value becomes lower. Therefore, the abnormality of the exhaust emission control catalyst can be determined by determining whether the final integration value indicates an excess amount below a predetermined amount.

However, by supplying the purge gas to the intake passage of the engine during the deceleration fuel cutoff (performing a purge) as in JP2007-198210A, oxygen stored in the exhaust emission control catalyst is consumed by the evaporated fuel within the purge gas during the deceleration fuel cutoff. Therefore, in the case where the purge is performed during the deceleration fuel cutoff, the stored oxygen amount in the exhaust emission control catalyst when the operation of the engine is shifted from the deceleration fuel cutoff to the normal operation is smaller than a case where the purge is not performed during the deceleration fuel cutoff. As a result, the final integration value calculated when the output value of the $O_2$ sensor is changed at least by the predetermined value indicates an excess amount below the predetermined amount, and thus, even if the exhaust emission control catalyst is normal, it may be falsely determined as abnormal.

SUMMARY

The present invention is made in view of the above situations and aims to suppress degradation in accuracy of an abnormality determination of an exhaust emission control catalyst of an engine due to a purge during a deceleration fuel cutoff of the engine.

According to one aspect of the present invention, a control system of an engine in which purge gas containing evaporated fuel desorbed from a canister is supplied to an intake passage of the engine, is provided. The control system includes a deceleration fuel cutoff module for performing a deceleration fuel cutoff to stop a fuel supply from an injector to the engine when a predetermined deceleration fuel cutoff condition is satisfied in a decelerating state of the engine, a purge unit for purging by supplying the purge gas to the intake passage during the deceleration fuel cutoff, an exhaust emission control catalyst provided in an exhaust passage of the engine, an $O_2$ sensor provided at a position of the exhaust passage downstream of the exhaust emission control catalyst, an abnormality determining module for determining an abnormality of the exhaust emission control catalyst by performing a rich operation of the engine when an operation of the engine is shifted from the deceleration fuel cutoff to a normal operation, calculating a total amount of excess fuel with respect to a stoichiometric amount of fuel in a period from the shift of the engine operation until an output value of the $O_2$ sensor changes by a predetermined value due to the rich operation of the engine, and determining whether the exhaust emission control catalyst is abnormal based on the total amount of the excess fuel, the normal operation performed to operate the engine by injecting the fuel from the injector to the engine and combusting the injected fuel, and a purge restricting module for restricting the purge during an immediately previous deceleration fuel cutoff that is a deceleration fuel cutoff performed immediately before the abnormality determination.

With this configuration, since the purge restricting module restricts the purge by the purge unit during the immediately previous deceleration fuel cutoff (e.g., prohibits the purge, or restricts a supply amount of the purge gas to the intake passage), degradation in accuracy of the abnormality determination of the exhaust emission control catalyst due to the purge can be suppressed.

During the immediately previous deceleration fuel cutoff, the purge restricting module preferably restricts the purge so that an air-fuel ratio within a combustion chamber of the engine exceeds a predetermined ratio.

With this configuration, the purge can be performed even during the immediately previous deceleration fuel cutoff so as not to influence a stored oxygen amount in the exhaust emission control catalyst when shifted from the immediately previous deceleration fuel cutoff to the normal operation. Further, by purging during the immediately previous deceleration fuel cutoff, the supply amount of the purge gas to the intake passage can be secured as much as possible.

The control system preferably further includes an air-fuel ratio estimating module for estimating an air-fuel ratio within a combustion chamber of the engine during the immediately previous deceleration fuel cutoff for a case where the purge is performed by the purge unit during the immediately previous deceleration fuel cutoff. The purge restricting module preferably prohibits the purge during the abnormality determination when the air-fuel ratio estimated by the air-fuel ratio estimating module is below a preset ratio.

When the air-fuel ratio within the combustion chamber is below the preset ratio, the purge greatly influences the stored oxygen amount in the exhaust emission control catalyst when shifted from the immediately previous deceleration fuel cutoff to the normal operation. However, in such a case, since the purge restricting module prohibits the purge, the degradation in accuracy of the abnormality determination of the exhaust emission control catalyst due to the purge can securely be suppressed.

The purge unit preferably includes a purge line through which the canister communicates with the intake passage, a purge valve provided in the purge line, and a purge valve controlling module for controlling a supply amount of the purge gas to the intake passage by performing a duty control of the purge valve when the purge is performed. The control system preferably further includes an evaporated fuel concentration estimating module for estimating a concentration of the evaporated fuel within the purge gas when the purge is performed by the purge unit during the immediately previous deceleration fuel cutoff. During the immediately previous deceleration fuel cutoff, the purge restricting module preferably restricts the supply amount of the purge gas to the intake passage controlled by the purge valve controlling module, based on the estimated concentration of the evaporated fuel.

When the concentration of the evaporated fuel within the purge gas is high, the stored oxygen amount in the exhaust emission control catalyst when shifted from the immediately previous deceleration fuel cutoff to the normal operation easily reduces due to the purge. However, in such a case, the purge restricting module restricts the supply amount of the purge gas to the intake passage controlled by the purge valve controlling module, based on the estimated concentration of the evaporated fuel by the evaporated fuel concentration estimating module. Therefore, by restricting the supply amount so that the oxygen amount will not reduce, the degradation in accuracy of the abnormality determination of the exhaust emission control catalyst can be suppressed. Further, the air-fuel ratio within the combustion chamber easily changes due to the duty control of the purge valve. However, when the purge is restricted by the air-fuel ratio as described above, by taking into consideration a change amount of the air-fuel ratio, the purge can more suitably be restricted.

When the estimated concentration of the evaporated fuel is above a predetermined concentration, the purge restricting module preferably prohibits the purge during the immediately previous deceleration fuel cutoff.

When the concentration of the evaporated fuel is too high, the purge greatly influences the stored oxygen amount in the exhaust emission control catalyst when shifted from the immediately previous deceleration fuel cutoff to the normal operation. However, in such a case, the purge restricting module prohibits the purge (i.e., the supply amount of the purge gas to the intake passage is reduced to zero). Therefore, the degradation in accuracy of the abnormality determination of the exhaust emission control catalyst due to the purge can securely be suppressed.

DETAILED DESCRIPTION OF EMBODIMENT

Hereinafter, one embodiment of the present invention is described in detail with reference to the appended drawings.

Figure 1:
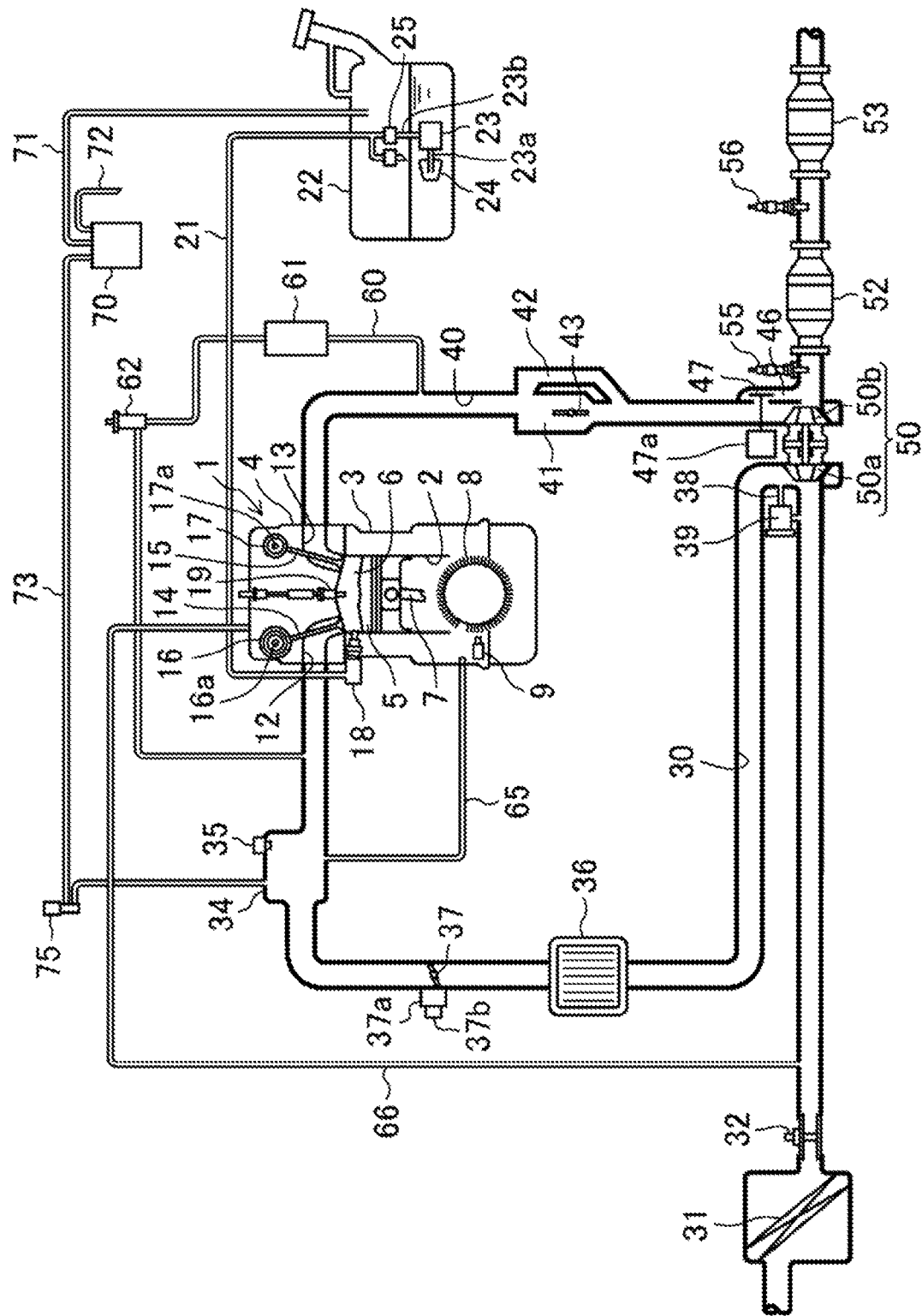
FIG. 1 is a view illustrating a schematic configuration of an engine controlled by a control system according to one embodiment of the present invention.

FIG. 1 is a view illustrating a schematic configuration of an engine 1 controlled by a control system 100 (see FIG. 2) according to one embodiment of the present invention. The engine 1 is a gasoline engine mounted on a vehicle and having a turbocharger. The engine 1 includes a cylinder block 3 where a plurality of cylinders 2 (only one cylinder is illustrated in FIG. 1) are arranged in a line, and a cylinder head 4 disposed on the cylinder block 3. A piston 5 defining a combustion chamber 6 together with the cylinder head 4 therebetween is reciprocatably fitted into each of the cylinders 2 of the engine 1. The piston 5 is coupled to a crankshaft (not illustrated) through a connecting rod 7. To the crankshaft, a detecting plate 8 for detecting a rotational angular position of the crankshaft is fixed to integrally rotate therewith, and an engine speed sensor 9 for detecting a rotational angular position of the detecting plate 8 to detect a speed of the engine 1 is provided.

In the cylinder head 4, an intake port 12 and an exhaust port 13 are formed for each cylinder 2, and an intake valve 14 for opening and closing the intake port 12 on the combustion chamber 6 side and an exhaust valve 15 for opening and closing the exhaust port 13 on the combustion chamber 6 side are provided for each cylinder 2. Each intake valve 14 is driven by an intake valve drive mechanism 16, and each exhaust valve 15 is driven by an exhaust valve drive mechanism 17. The intake valve 14 reciprocates at a predetermined timing by the intake valve drive mechanism 16 to open and close the intake port 12, the exhaust valve 15 reciprocates at a predetermined timing by the exhaust valve drive mechanism 17 to open and close the exhaust port 13, and thus, gas inside the cylinder 2 is exchanged. The intake and exhaust valve drive mechanisms 16 and 17 have an intake camshaft 16a and an exhaust camshaft 17a which are coupled to the crankshaft to be drivable, respectively. The camshafts 16a and 17a rotate in synchronization with the rotation of the crankshaft. Moreover, the intake valve drive mechanism 16 includes a hydraulically/mechanically-driven phase variable mechanism (Variable Valve Timing: VVT) for varying a phase of the intake camshaft 16a within a predetermined angle range.

An injector 18 for injecting fuel (in this embodiment, gasoline) is provided in an upper (cylinder head 4 side) end part of the cylinder block 3, for each cylinder 2. The injector 18 is disposed such that a fuel injection port thereof is oriented toward an inside of the combustion chamber 6, and directly injects the fuel into the combustion chamber 6 near a top dead center of compression stroke (CTDC). Note that the injectors 18 may be provided to the cylinder head 4.

The injectors 18 are connected to a fuel tank 22 via a fuel supply tube 21. Inside the fuel tank 22, a fuel pump 23 is disposed to be submerged in the fuel. The fuel pump 23 has a suction tube 23a for sucking the fuel, and a discharge tube 23b for discharging the sucked fuel. The suction tube 23a has a strainer 24 at its tip. The discharge tube 23b is connected to the injectors 18 via a regulator 25. The fuel pump 23 sucks the fuel with the suction tube 23a and then discharges the fuel with the discharge tube 23b for a pressure adjustment at the regulator 25, so as to send the fuel to the injectors 18. Specifically, the fuel supply tube 21 is connected to a fuel distribution tube (not illustrated) extending in a cylinder row direction; the fuel distribution tube is connected to the injectors 18 of the respective cylinders 2, and thus, the fuel from the fuel pump 23 is distributed to the injectors 18 of the respective cylinders 2 by the fuel distribution tube.

Inside the cylinder head 4, an ignition plug 19 is disposed for each cylinder 2. A tip part (electrode) of the ignition plug 19 is located near a ceiling of the combustion chamber 6. Further, the ignition plug 19 produces a spark at a predetermined ignition timing, and thus a mixture gas of the fuel and air is combusted in response to the spark.

On one side surface of the engine 1, an intake passage 30 is connected to communicate with the intake ports 12 of the cylinders 2. An air cleaner 31 for filtrating intake air is disposed in an upstream end part of the intake passage 30, and the intake air filtered by the air cleaner 31 is supplied to the combustion chambers 6 of the respective cylinders 2 via the intake passage 30 and the intake ports 12.

An airflow sensor 32 for detecting a flow rate of the intake air sucked into the intake passage 30 is disposed at a position of the intake passage 30 near the downstream side of the air cleaner 31. Further, a surge tank 34 is disposed near a downstream end of the intake passage 30. Part of the intake passage 30 downstream of the surge tank 34 is branched into independent passages extending toward the respective cylinders 2, and downstream ends of the independent passages are connected to the intake ports 12 of the cylinders 2, respectively. A pressure sensor 35 for detecting pressure inside the surge tank 34 is disposed in the surge tank 34.

Moreover, in the intake passage 30, a compressor 50a of a turbocharger 50 is disposed between the airflow sensor 32 and the surge tank 34. The intake air is turbocharged by the compressor 50a in operation.

Furthermore, in the intake passage 30, an intercooler 36 for cooling air compressed by the compressor 50a, and a throttle valve 37 are arranged between the compressor 50a of the turbocharger 50 and the surge tank 34 in this order from the upstream side. The throttle valve 37 is driven by a drive motor 37a to change a cross-sectional area of the intake passage 30 at the disposed position of the throttle valve 37, so as to adjust an amount of intake air flowing into the combustion chambers 6 of the respective cylinders 2. An opening of the throttle valve 37 is detected by a throttle opening sensor 37b.

Additionally, in this embodiment, an intake bypass passage 38 for bypassing the compressor 50a is provided to the intake passage 30, and an air bypass valve 39 is provided in the intake bypass passage 38. The air bypass valve 39 is normally fully closed, but, for example, when the opening of the throttle valve 37 is sharply reduced, a sharp increase and sharp surging of pressure occur in the part of the intake passage 30 upstream of the throttle valve 37, and the rotation of the compressor 50a is disturbed, which results in causing a loud noise; therefore, the air bypass valve 39 is opened to prevent such a situation.

On the other side surface of the engine 1, an exhaust passage 40 is connected to discharge exhaust gas from the combustion chambers 6 of the cylinders 2. An upstream part of the exhaust passage 40 is comprised of an exhaust manifold having independent passages extending to the respective cylinders 2 and connected to respective external ends of the exhaust ports 13 of the cylinders 2, and a manifold section where the respective independent passages are collected together. A turbine 50b of the turbocharger 50 is disposed in part of the exhaust passage 40 downstream of the exhaust manifold. The turbine 50b is rotated by the flow of the exhaust gas, and the compressor 50a coupled to the turbine 50b is operated by the rotation of the turbine 50b.

Part of the exhaust passage 40 which is downstream of the exhaust manifold and upstream of the turbine 50b is branched into a first passage 41 and a second passage 42. A flow rate changing valve 43 for changing a flow rate of the exhaust gas flowing toward the turbine 50b is provided in the first passage 41. The second passage 42 merges with the first passage 41 at a position downstream of the flow rate changing valve 43 and upstream of the turbine 50b.

Further, an exhaust bypass passage 46 for guiding the exhaust gas of the engine 1 to flow while bypassing the turbine 50b is provided in the exhaust passage 40. An end part of the exhaust bypass passage 46 on the flow-in side of the exhaust gas (an upstream end part of the exhaust bypass passage 46) is connected to a position of the exhaust passage 40 between the merging section of the first and second passages 41 and 42 in the exhaust passage 40 and the turbine 50b. An end part of the exhaust bypass passage 46 on the flow-out side of the exhaust gas (a downstream end part of the exhaust bypass passage 46) is connected to a position of the exhaust passage 40 downstream of the turbine 50b and upstream of an upstream exhaust emission control catalyst 52 (described later).

The end part of the exhaust bypass passage 46 on the flow-in side of the exhaust gas is provided with a wastegate valve 47 that is driven by a drive motor 47a. The wastegate valve 47 is controlled by the control system 100 according to an operating state of the engine 1. When the wastegate valve 47 is fully closed, the entire amount of exhaust gas flows to the turbine 50b, and when the wastegate valve 47 is not fully closed, the flow rate of the exhaust gas to the exhaust bypass passage 46 (i.e., the flow rate of the exhaust gas to the turbine 50b) changes according to the opening of the wastegate valve 47. In other words, as the opening of the wastegate valve 47 becomes larger, the flow rate of the exhaust gas to the exhaust bypass passage 46 becomes higher, and the flow rate of the exhaust gas to the turbine 50b becomes lower. When the wastegate valve 47 is fully opened, the turbocharger 50 substantially does not operate.

Part of the exhaust passage 40 downstream of the turbine 50b (downstream of the position connected to the downstream end part of the exhaust bypass passage 46) is provided with exhaust emission control catalysts 52 and 53 constructed with an oxidation catalyst, etc., and for purifying hazardous components contained within the exhaust gas (and unburned evaporated fuel during a deceleration fuel cutoff, described later). In this embodiment, the two exhaust emission control catalysts, the upstream exhaust emission control catalyst 52 and the downstream exhaust emission control catalyst 53, are provided; however, just the upstream exhaust emission control catalyst 52 may be provided, instead.

In the exhaust passage 40, a linear $O_2$ sensor 55 having an output property which is linear with respect to an oxygen concentration within the exhaust gas is disposed near the upstream side of the upstream exhaust emission control catalyst 52. The linear $O_2$ sensor 55 is an air-fuel ratio sensor for detecting the oxygen concentration within the exhaust gas for the purpose of performing a feedback control of an air-fuel ratio within the combustion chambers 6. Further in the exhaust passage 40, an $O_2$ sensor 56 for detecting a state of the air-fuel ratio of the exhaust gas after passing through the upstream exhaust emission control catalyst 52 among stoichiometric, rich, or lean is disposed between the upstream and downstream exhaust emission control catalysts 52 and 53. In this embodiment, when the air-fuel ratio is stoichiometric or rich, an output value (output voltage) of the $O_2$ sensor 56 indicates a first voltage (e.g., approximately 1V), and when the air-fuel ratio is lean, the output value indicates a second voltage (e.g., approximately 0V) which is lower than the first voltage.

The engine 1 includes an EGR passage 60 for recirculating part of the exhaust gas from the exhaust passage 40 to the intake passage 30. The EGR passage 60 connects the part of the exhaust passage 40 upstream of the branched section of the first and second passages 41 and 42 to the independent passages of the intake passage 30 downstream of the surge tank 34. An EGR cooler 61 for cooling the exhaust gas passing therethrough and an EGR valve 62 for adjusting an amount of the exhaust gas recirculated by the EGR passage 60 are disposed in the EGR passage 60.

The engine 1 also includes first and second ventilation hoses 65 and 66 for returning back to the intake passage 30 blow-by gas leaked from the combustion chambers 6. The first ventilation hose 65 connects a lower part (crank case) of the cylinder block 3 to the surge tank 34, and the second ventilation hose 66 connects an upper part of the cylinder head 4 to part of the intake passage 30 between the air cleaner 31 and the compressor 50a.

The fuel tank 22 is connected to a canister 70 containing an adsorbent (e.g., activated charcoal) therein, via a connecting tube 71. Fuel evaporated inside the fuel tank 22 flows to the canister 70 via the connecting tube 71 and is trapped by the canister 70 (adsorbent). An inside of the canister 70 communicates with ambient air via an ambient air communicating tube 72.

The canister 70 is connected to the intake passage 30 via a purge tube 73 (purge line). In this embodiment, an end part of the purge tube 73 on the intake passage 30 side is connected to the surge tank 34 provided downstream of the compressor 50a in the intake passage 30.

The purge tube 73 is provided with a purge valve 75. When the purge valve 75 is opened and the pressure inside the surge tank 34 is negative (i.e., when the intake air is not turbocharged by the compressor 50a of the turbocharger 50), the ambient air (air) is introduced into the ambient air communicating tube 72, the evaporated fuel trapped in the canister 70 is desorbed therefrom by the flow of the air, and then the desorbed evaporated fuel is supplied along with the air as purge gas, to the surge tank 34 (a purge is performed). A supply amount (or a supply flow rate) of the purge gas to the surge tank 34 (intake passage 30) is determined based on an opening of the purge valve 75 and a pressure difference Pd between the pressure inside the surge tank 34 (the pressure detected by the pressure sensor 35) and atmospheric pressure (pressure detected by an atmospheric pressure sensor 91, described later).

Figure 2:
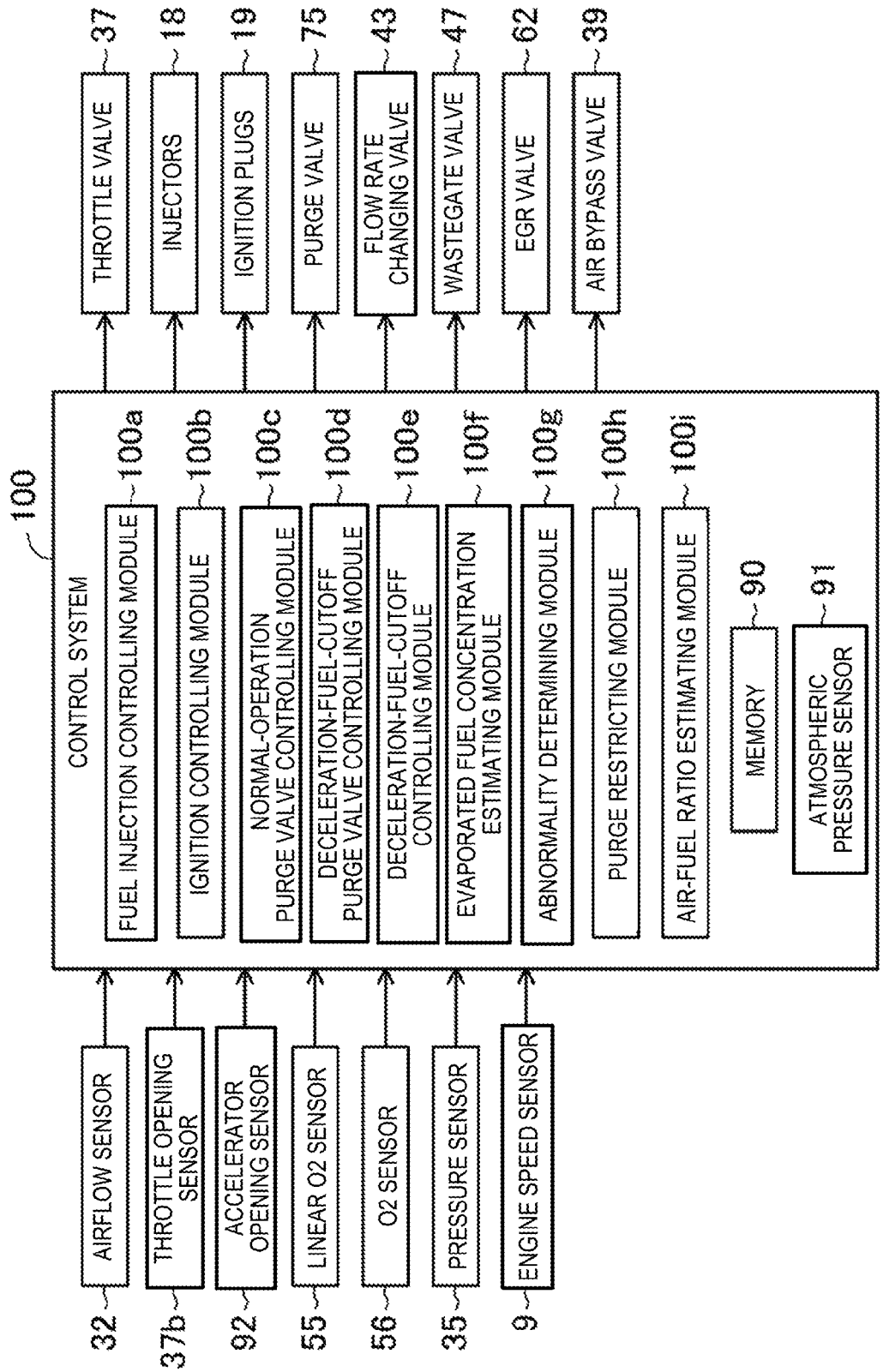
FIG. 2 is a block diagram illustrating a configuration of the control system of the engine.

As illustrated in FIG. 2, operations of the throttle valve 37 (specifically, the drive motor 37a), the injectors 18, the ignition plugs 19, the purge valve 75, the flow rate changing valve 43, the wastegate valve 47 (specifically, the drive motor 47a), the EGR valve 62, and the air bypass valve 39 are controlled by the control system 100. The control system 100 is a controller based on a well-known microcomputer, and includes a central processing unit (CPU) for executing program(s), a memory 90 comprised of, for example, a RAM and/or a ROM and for storing the program(s) and data, and an input/output (I/O) bus for inputting and outputting electric signals (FIG. 2 only illustrates the memory 90 thereamong).

The control system 100 receives signals indicating output values of various sensors including the airflow sensor 32, the throttle opening sensor 37*b*, an accelerator opening sensor 92 for detecting a stepping amount of an acceleration pedal (accelerator opening) by a driver of the vehicle on which the engine 1 is mounted, the linear $O_2$ sensor 55, the $O_2$ sensor 56, the pressure sensor 35, and the engine speed sensor 9. In this embodiment, the control system 100 is provided with the atmospheric pressure sensor 91 for detecting the atmospheric pressure. The control system 100 controls the operations of the valves described above, based on the output values of the various sensors. Particularly, the operation control of the injectors 18 (fuel injection control) is performed by a fuel injection controlling module 100*a* of the control system 100, the operation control of the ignition plugs 19 is performed by an ignition controlling module 100*b* of the control system 100, and the operation control of the purge valve 75 (opening control, i.e., the control of the supply amount of the purge gas to the surge tank 34) is performed by one of a normal-operation purge valve controlling module 100*c* and a deceleration-fuel-cutoff purge valve controlling module 100*d* of the control system 100. Note that the operation control of the purge valve 75 by one of the normal-operation purge valve controlling module 100*c* and the deceleration-fuel-cutoff purge valve controlling module 100*d* of the control system 100 is performed through a control of a duty ratio of a control signal transmitted to the purge valve 75 (a duty control of the purge valve 75).

The control system 100 also includes a deceleration-fuel-cutoff controlling module 100*e* (deceleration fuel cutoff module), an evaporated fuel concentration estimating module 100*f*, an abnormality determining module 100*g*, a purge restricting module 100*h*, and an air-fuel ratio estimating module 100*i*, which are described later in detail.

When a predetermined deceleration fuel cutoff condition is satisfied while the engine 1 is in a decelerating state, the deceleration-fuel-cutoff controlling module 100*e* performs a deceleration fuel cutoff to stop the fuel supply from the injectors 18 to the engine 1. The predetermined deceleration fuel cutoff condition is, for example, a condition in which the opening of the throttle valve 37 is detected by the throttle opening sensor 37*b* to be fully closed and the speed of the engine 1 is detected by engine speed sensor 9 to be above a predetermined speed (slightly above an idling speed). During the deceleration fuel cutoff, the injectors 18 and the ignition plugs 19 are not operated.

During the deceleration fuel cutoff, the deceleration-fuel-cutoff purge valve controlling module 100*d* controls the operation of the purge valve 75 (the supply amount of the purge gas to the surge tank 34). Specifically, the purge by supplying the purge gas to the surge tank 34 is performed during a normal operation of the engine 1 (operation in which the fuel is injected by the injectors 18 and the injected fuel is ignited by the ignition plugs 19) and also during the deceleration fuel cutoff. The operation control of the purge valve 75 during the deceleration fuel cutoff is described later. In this embodiment, the purge tube 73 (purge line), the purge valve 75, and the deceleration-fuel-cutoff purge valve controlling module 100*d* (purge valve controlling module) constitute a purge unit for purging by supplying the purge gas to the intake passage 30 of the engine 1 during the deceleration fuel cutoff.

On the other hand, during the normal operation of the engine 1 (other than the deceleration fuel cutoff), the normal-operation purge valve controlling module 100*c* controls the operation of the purge valve 75 according to the operating state of the engine 1. In this embodiment, when the engine 1 is in an operating state where the turbocharger 50 is operated to turbocharge the intake air, since the pressure inside the surge tank 34 is not negative, the normal-operation purge valve controlling module 100*c* fully closes the purge valve 75, and when the engine 1 is in an operating state where the turbocharger 50 is not operated, the normal-operation purge valve controlling module 100*c* performs the purge.

When the purge is performed during the normal operation of the engine 1, the evaporated fuel concentration estimating module 100*f* learns by estimation a concentration of the evaporated fuel within the purge gas based on a feedback correction amount of the air-fuel ratio obtained based on the output value of the linear $O_2$ sensor 55, and the evaporated fuel concentration estimating module 100*f* stores (updates) the learned value of the concentration of the evaporated fuel in the memory 90. The fuel injection controlling module 100*a* corrects the fuel injection amount based on the feedback correction amount and the learned value.

In other words, a shift of the air-fuel ratio within the combustion chambers 6 caused by supplying the purge gas (evaporated fuel) to the surge tank 34 of the intake passage 30 is detected by the linear $O_2$ sensor 55. The fuel injection controlling module 100*a* performs the feedback correction of the air-fuel ratio (i.e., fuel injection amount) based on the detected value (output value), and corrects the fuel injection amount according to the learned value of the concentration of the evaporated fuel, so as to compensate for a response lag of the feedback correction.

In this embodiment, the evaporated fuel concentration estimating module 100*f* estimates the concentration of the evaporated fuel within the purge gas when the purge is performed during the deceleration fuel cutoff, to be the learned value immediately before the deceleration fuel cutoff (the latest learned value stored in the memory 90). Even in this manner, a period of time for which the deceleration fuel cutoff is performed continuously is comparatively short and a possibility of the concentration of the evaporated fuel greatly changing during the time period is low; therefore, no problem will occur.

Figure 3:
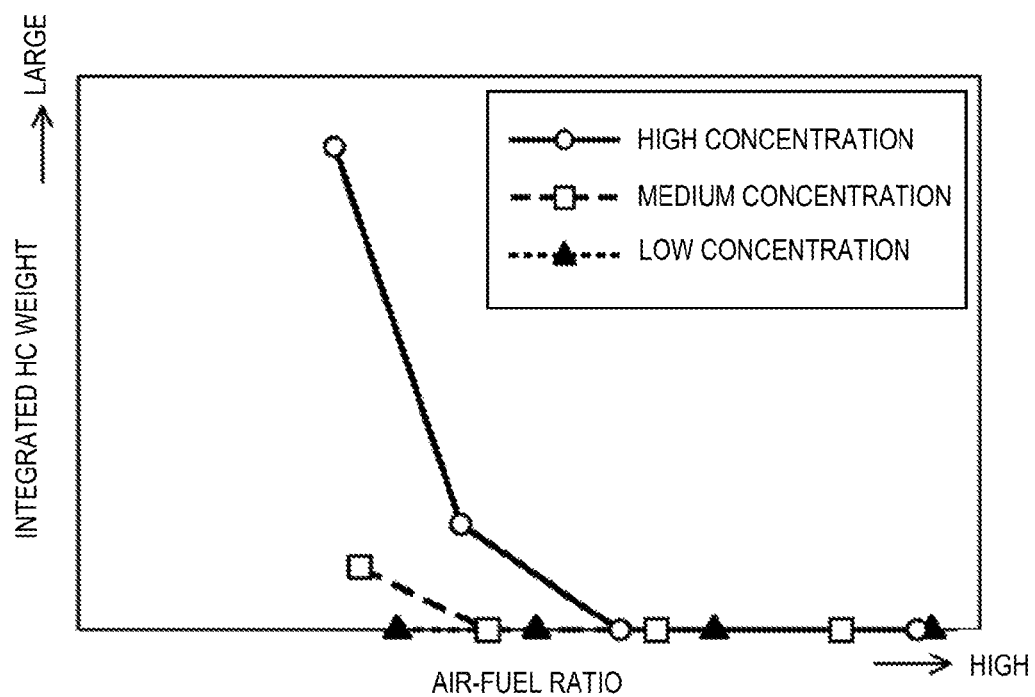
FIG. 3 is a chart illustrating relationships between an air-fuel ratio within combustion chambers and an integrated weight of hydrocarbons (HC) after passing through a downstream exhaust emission control catalyst, for cases where a concentration (learned value) of evaporated fuel indicates a high concentration, a middle concentration, and a low concentration, respectively.
Figure 4:
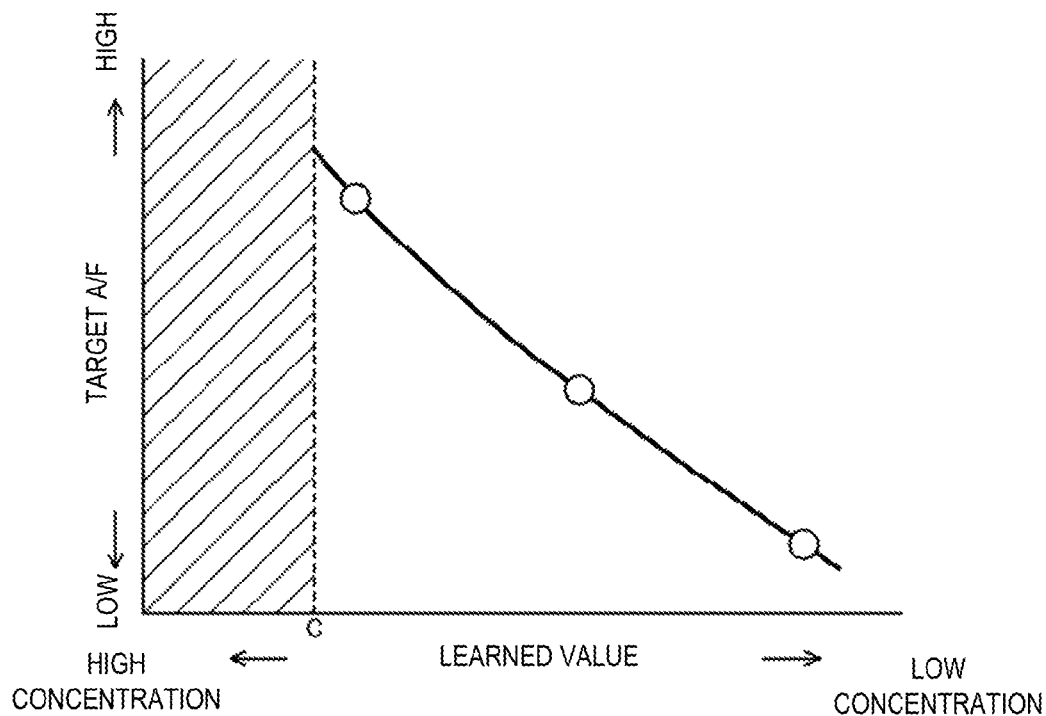
FIG. 4 is a chart illustrating a first map indicating a relationship between the learned value of the concentration of the evaporated fuel and a target air-fuel ratio (A/F).

The deceleration-fuel-cutoff purge valve controlling module 100*d* first calculates a target air-fuel ratio (target A/F) when the purge is performed during the deceleration fuel cutoff. FIG. 3 is a chart illustrating relationships between the air-fuel ratio within the combustion chambers 6 and an integrated weight of HC after passing through the downstream exhaust emission control catalyst 53, for cases where the concentration (learned value) of the evaporated fuel indicates a high concentration, a middle concentration, and a low concentration, respectively. From FIG. 3, it can be understood that at each concentration, the integrated weight of HC is reduced as the air-fuel ratio becomes higher, and when the air-fuel ratio exceeds a certain ratio, the integrated weight of HC becomes 0 (zero). Therefore, the target A/F may be set to be a ratio equal to or larger than a smallest air-fuel ratio at which the integrated weight of HC becomes 0 at each concentration (preferably a ratio equal or close to the smallest air-fuel ratio, in view of increasing the supply amount of the purge gas to the surge tank 34 as much as possible when the purge is performed). The relationship between the learned value and the target A/F is stored in the memory 90 in advance in a form of a first map as illustrated in FIG. 4, and by using the first map, the target A/F is calculated based on the learned value obtained immediately before the deceleration fuel cutoff. Note that in the first map, the target A/F is not set for when the learned value indicates a concentration higher than a preset concentration C (the hatched section in FIG. 4), in other words, when the learned value indicates a concentration high enough that the evaporated fuel cannot suitably be purified by the exhaust emission control catalysts 52 and 53. In this case, the deceleration-fuel-cutoff purge valve controlling module 100d does not perform the purge (i.e., it fully closes the purge valve 75) during the deceleration fuel cutoff.

Further, a mass ratio ra of the evaporated fuel with respect to the entirety of the purge gas is calculated based on the learned value. A total air mass qa sucked into the combustion chambers 6 and discharged to the exhaust passage 40 when the purge is performed during the deceleration fuel cutoff is calculated based on the output value of the airflow sensor 32, the mass ratio ra, and the output value of the linear $O_2$ sensor 55.

When a mass of the evaporated fuel inside the combustion chambers 6 (same as the mass of the evaporated fuel within the purge gas) is "ggas,"

target $A/F=qa/ggas$.

Based on such a relationship, $ggas=qa/(\text{target } A/F)$.

The mass ggas of the evaporated fuel inside the combustion chambers 6 is calculated by substituting the calculated values of the target A/F and the total air mass qa into this equation.

Further, when a mass of air within the purge gas is "gair,"

$(1-ra):ra=gair:ggas$.

Thus, $gair=ggas\times(1-ra)/ra$.

Based on this equation, the mass gair of the air within the purge gas is calculated.

When a total mass of the evaporated fuel and the air within the purge gas is "gprg,"

$gprg=ggas+gair$.

A purge gas volume qprg corresponding to the total mass gprg converted into volume is, with a density of the purge gas as cp, $qprg=gprg\times cp$.

Note that a value corresponding to the mass ratio ra of the evaporated fuel with respect to the entirety of the purge gas is stored in the memory 90 in advance as the density cp of the purge gas.

The deceleration-fuel-cutoff purge valve controlling module 100d controls the supply amount of the purge gas to the surge tank 34 (the opening of the purge valve 75) when the purge is performed during the deceleration fuel cutoff, based on the purge gas volume qprg and the pressure difference Pd.

When the operation of the engine 1 is shifted from the deceleration fuel cutoff performed by the deceleration-fuel-cutoff controlling module 100e to the normal operation, the abnormality determining module 100g performs a rich operation of the engine 1 and calculates a total amount of excess fuel with respect to a stoichiometric amount of fuel in a period from the shift of the engine operation until the output value of the $O_2$ sensor 56 changes at least by a predetermined value due to the rich operation of the engine 1 (final excess fuel integration value, described later). The abnormality determining module 100g determines whether the upstream exhaust emission control catalyst 52 is abnormal based on the total amount of excess fuel (performs an abnormality determination).

Figure 5:
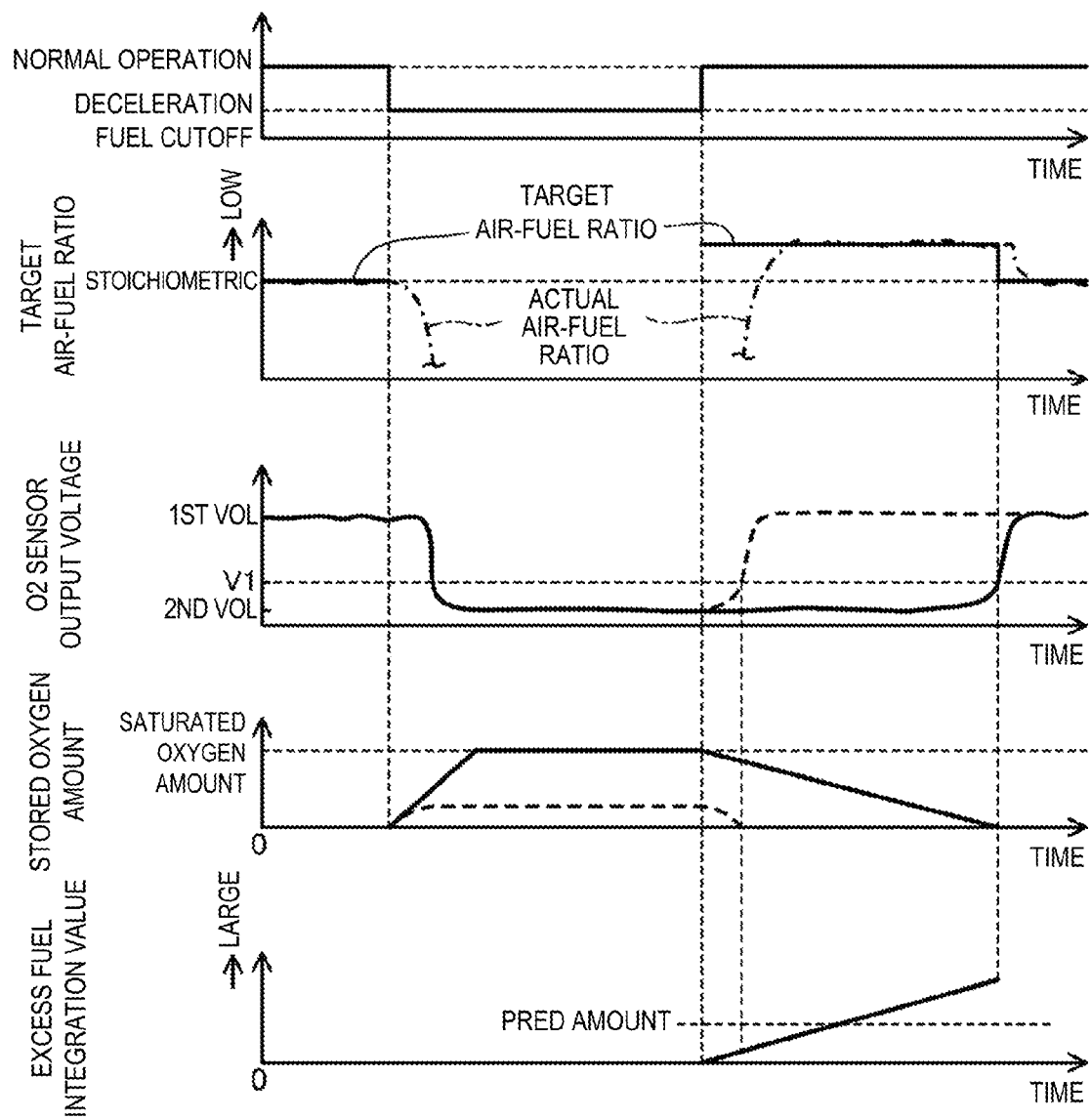
FIG. 5 shows time charts illustrating changes of a target air-fuel ratio within the combustion chambers in a normal operation of the engine, an output value of an $O_2$ sensor, a stored oxygen amount in an upstream exhaust emission control catalyst, and an excess fuel integration value, when an operation of the engine is shifted from the normal operation to a deceleration fuel cutoff and then the deceleration fuel cutoff is ended and shifted back to the normal operation.

Here, changes of the target air-fuel ratio within the combustion chambers 6 in the normal operation of the engine, the output value (output voltage) of the $O_2$ sensor 56, a stored oxygen amount in the upstream exhaust emission control catalyst 52, and an excess fuel integration value, described later, when the operation of the engine 1 is shifted from the normal operation to the deceleration fuel cutoff and then the deceleration fuel cutoff is ended and shifted back to the normal operation, are illustrated in FIG. 5.

When shifted from the normal operation to the deceleration fuel cutoff of the engine 1, the air-fuel ratio (actual air-fuel ratio) within the combustion chambers 6 increases from the stoichiometric state (air excess ratio $\lambda=1$), and the output value of the $O_2$ sensor 56 eventually drops from the first voltage to the second voltage. During the deceleration fuel cutoff, oxygen is stored in the upstream exhaust emission control catalyst 52 and, thus, the stored oxygen amount in the upstream exhaust emission control catalyst 52 gradually increases (FIG. 5 illustrates a state where the stored oxygen amount increases from zero). When the stored oxygen amount in the upstream exhaust emission control catalyst 52 reaches a saturated oxygen amount over which oxygen cannot be stored (the saturated oxygen amount is determined based on a volume of the upstream exhaust emission control catalyst 52), the stored oxygen amount does not increase anymore and is maintained at the saturated oxygen amount. Normally, the stored oxygen amount reaches the saturated oxygen amount during the deceleration fuel cutoff as illustrated in FIG. 5.

Note that, under a condition in which the upstream exhaust emission control catalyst 52 is normal, whether the stored oxygen amount in the upstream exhaust emission control catalyst 52 is increased to the saturated oxygen amount during the deceleration fuel cutoff can be determined based on an integration value of the total air mass qa during the deceleration fuel cutoff. When it is determined that the stored oxygen amount in the upstream exhaust emission control catalyst 52 is increased to the saturated oxygen amount during the deceleration fuel cutoff, the abnormality determining module 100g determines the abnormality, whereas, for example, in a case where the deceleration fuel cutoff is ended significantly early and it is determined that the stored oxygen amount in the upstream exhaust emission control catalyst 52 is not increased to the saturated oxygen amount during the deceleration fuel cutoff, the abnormality determining module 100g does not determine the abnormality.

When the operation of the engine 1 is shifted from the deceleration fuel cutoff to the normal operation, the abnormality determining module 100g starts the abnormality determination. Specifically, when shifted to the normal operation, the abnormality determining module 100g performs the rich operation of the engine 1. In other words, as illustrated in FIG. 5, the abnormality determining module 100g sets the target air-fuel ratio to be less than stoichiometric (reduces the target air excess ratio $\lambda$ to be below 1). Thus, the fuel injection controlling module 100a causes the injectors 18 to inject the fuel so that the air-fuel ratio within the combustion chambers becomes richer than stoichiometric. An amount of excess fuel with respect to a stoichiometric amount of fuel in the injected fuel is oxidized and purified by the oxygen stored in the upstream exhaust emission control catalyst 52. Therefore, as the rich operation proceeds, as illustrated in FIG. 5, the stored oxygen amount in the upstream exhaust emission control catalyst 52 gradually reduces from the saturated oxygen amount, which eventually becomes zero. When the stored oxygen amount in the upstream exhaust emission control catalyst 52 becomes zero as above, the amount of excess fuel cannot be purified by the upstream exhaust emission control catalyst 52 and the output value of the $O_2$ sensor 56 changes from the second voltage to the first voltage.

The abnormality determining module 100g calculates the excess fuel integration value that is an integration value of the excess fuel amount in the period from the shift from the deceleration fuel cutoff to the normal operation to the change of the output value of the $O_2$ sensor 56 changes at least by the predetermined value. In this embodiment, the change of the output value of the $O_2$ sensor 56 at least by the predetermined value is larger than a change caused by a variation of the second voltage and corresponds to an early stage of the change from the second voltage to the first voltage. For example, the output value of the $O_2$ sensor 56 is considered to have changed at least by the predetermined value when the output value of the $O_2$ sensor 56 reaches a predetermined voltage V1 (far below the first voltage and close to the second voltage), for example, 0.2V above the second voltage.

As illustrated in FIG. 5, the excess fuel integration value gradually increases from the start of the rich operation (when shifted from the deceleration fuel cutoff to the normal operation). The final excess fuel integration value calculated finally when the output value of the $O_2$ sensor 56 reaches the predetermined voltage V1 (the total amount of the excess fuel with respect to the stoichiometric amount of fuel in the period from the shift of the engine operation to the change of the output value of the $O_2$ sensor 56 at least by the predetermined value) indicates an amount corresponding to the stored oxygen amount in the upstream exhaust emission control catalyst 52 when shifted from the deceleration fuel cutoff to the normal operation. When the upstream exhaust emission control catalyst 52 is normal, the stored oxygen amount in the upstream exhaust emission control catalyst 52 when shifted from the deceleration fuel cutoff to the normal operation is the saturated oxygen amount, and as illustrated in FIG. 5, the final excess fuel integration value is above a predetermined amount.

On the other hand, if the abnormality of the upstream exhaust emission control catalyst 52 occurs due to the deterioration etc., a largest storable oxygen amount in the upstream exhaust emission control catalyst 52 reduces below the saturated oxygen amount, and thus, the stored oxygen amount in the upstream exhaust emission control catalyst 52 when shifted from the deceleration fuel cutoff to the normal operation becomes below the saturated oxygen amount (see the dashed line of the stored oxygen amount in FIG. 5). As a result, the final excess fuel integration value indicates an excess amount below the predetermined amount. Therefore, the abnormality determining module 100g determines the abnormality of the upstream exhaust emission control catalyst 52 based on whether the final excess fuel integration value is higher or lower with respect to the predetermined amount.

Note that when the output value of the $O_2$ sensor 56 changes at least by the predetermined value (the output value of the $O_2$ sensor 56 reaches the predetermined voltage V1), as illustrated in FIG. 5, the rich operation performed by the abnormality determining module 100g is stopped and the target air-fuel ratio is set to be stoichiometric (the target air excess ratio λ is set to 1).

The predetermined amount is determined in advance under a condition in which the purge is not performed during an immediately previous deceleration fuel cutoff. The immediately previous deceleration fuel cutoff is a deceleration fuel cutoff performed immediately before the abnormality is determined by the abnormality determining module 100g. If the purge is performed during the immediately previous deceleration fuel cutoff, oxygen stored in the upstream exhaust emission control catalyst 52 reduces by being consumed during the immediately previous deceleration fuel cutoff. Therefore, in the case where the purge is performed during the immediately previous deceleration fuel cutoff, the stored oxygen amount in the upstream exhaust emission control catalyst 52 when shifted from the immediately previous deceleration fuel cutoff to the normal operation becomes smaller than a case where the purge is not performed during the immediately previous deceleration fuel cutoff. As a result, the final excess fuel integration value indicates an excess amount below the predetermined amount, and thus, even if the upstream exhaust emission control catalyst 52 is normal, it may be falsely determined as abnormal.

Therefore, the purge restricting module 100h restricts the purge performed by the deceleration-fuel-cutoff purge valve controlling module 100d during the immediately previous deceleration fuel cutoff, so as to suppress the false determination in the abnormality determination.

Figure 6:
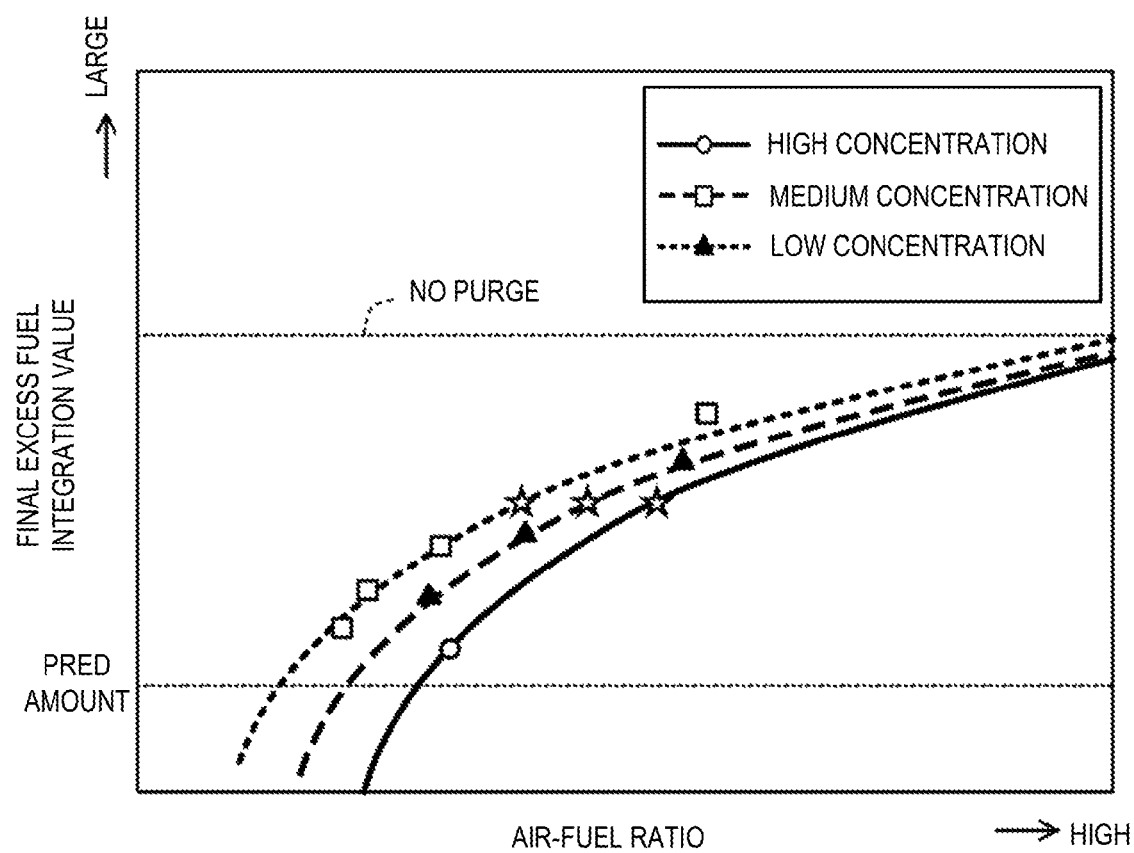
FIG. 6 is a chart illustrating relationships between the air-fuel ratio within the combustion chambers of the engine and a final excess fuel integration value during an immediately previous deceleration fuel cutoff in a case where the purge is performed during the immediately previous deceleration fuel cutoff, for cases where the concentration (learned value) of the evaporated fuel indicates the high concentration, the middle concentration, and the low concentration, respectively.

Here, FIG. 6 illustrates relationships between the air-fuel ratio within the combustion chambers 6 of the engine 1 and the final excess fuel integration value during the immediately previous deceleration fuel cutoff in the case where the purge is performed during the immediately previous deceleration fuel cutoff, for cases where the concentration (learned value) of evaporated fuel indicates the high concentration, the middle concentration, and the low concentration, respectively.

Based on FIG. 6, it can be understood that at each concentration, the final excess fuel integration value greatly reduces once the air-fuel ratio falls below a certain ratio (the air-fuel ratio indicated by the star-shaped symbol). Therefore, in the case of purging during the immediately previous deceleration fuel cutoff, by setting the target A/F at each concentration during the immediately previous deceleration fuel cutoff to be equal to or larger than the air-fuel ratio indicated by the star-shaped symbol in FIG. 6, the purge hardly influences the final excess fuel integration value (i.e., the stored oxygen amount in the upstream exhaust emission control catalyst 52 when shifted from the immediately previous deceleration fuel cutoff to the normal operation). Specifically, the final excess fuel integration value in the case where the purge is not performed during the immediately previous deceleration fuel cutoff is a value indicated by the "NO PURGE" line in FIG. 6, and by setting the target A/F during the immediately previous deceleration fuel cutoff to be equal to or larger than the air-fuel ratio indicated by the star-shaped symbol, the final excess fuel integration value in the case where the purge is performed during the immediately previous deceleration fuel cutoff has no significant difference from that in the case where the purge is not performed during the immediately previous deceleration fuel cutoff. In view of increasing the supply amount of the purge gas to the surge tank 34 as much as possible, the target A/F during the immediately previous deceleration fuel cutoff is preferably equal or close to the air-fuel ratio indicated by the star-shaped symbol. In this embodiment, since the air-fuel ratio within the combustion chambers 6 changes due to the duty control of the purge valve 75, the target A/F during the immediately previous deceleration fuel cutoff is preferably an air-fuel ratio determined by taking into consideration a change amount of the air-fuel ratio caused by the duty control, based on the air-fuel ratio indicated by the star-shaped symbol (an air-fuel ratio obtained by adding, to the air-fuel ratio indicated by the star-shaped symbol, a difference between an average value and a minimum value of the changed air-fuel ratios caused by the duty control).

The relationship between the learned value and the target A/F during the immediately previous deceleration fuel cutoff is stored in the memory 90 in advance in the form of a second map (a map in which the target A/F becomes higher as the concentration of the evaporated fuel becomes higher, similar to the first map). In the case of purging during the immediately previous deceleration fuel cutoff, the purge restricting module 100h calculates the target A/F for during the immediately previous deceleration fuel cutoff based on the learned value obtained immediately before the immediately previous deceleration fuel cutoff by using the second map. With the same learned value, the target A/F during the immediately previous deceleration fuel cutoff becomes larger than the target A/F calculated based on the first map in FIG. 4 (the target A/F during the deceleration fuel cutoff that is not the immediately previous deceleration fuel cutoff). Further, the purge restricting module 100h calculates the purge gas volume qprg based on the calculated target A/F during the immediately previous deceleration fuel cutoff in a manner similar to the manner that the deceleration-fuel-cutoff purge valve controlling module 100d calculates the purge gas volume qprg, and the purge restricting module 100h then controls the supply amount of the purge gas to the surge tank 34 (the opening of the purge valve 75) based on the purge gas volume qprg and the pressure difference Pd. Thus, the air-fuel ratio within the combustion chambers 6 of the engine 1 exceeds a predetermined ratio (the air-fuel ratio equal or close to the air-fuel ratio indicated by the star-shaped symbol in FIG. 6) so that the final excess fuel integration value does not significantly reduce. Therefore, during the immediately previous deceleration fuel cutoff, the purge restricting module 100h restricts the purge so that the air-fuel ratio within the combustion chambers 6 of the engine 1 exceeds the predetermined ratio.

As described above, the evaporated fuel concentration estimating module 100f estimates the concentration of the evaporated fuel within the purge gas when the purge is performed during the deceleration fuel cutoff, to be the learned value immediately before the deceleration fuel cutoff (the latest learned value stored in the memory 90). Therefore, the concentration of the evaporated fuel within the purge gas when the purge is performed during the immediately previous deceleration fuel cutoff is also estimated to be the learned value immediately before the immediately previous deceleration fuel cutoff. As described above, the purge gas volume qprg calculated by the purge restricting module 100h is based on the estimated value (learned value) of the concentration of the evaporated fuel within the purge gas by the evaporated fuel concentration estimating module 100f. Therefore, the purge restricting module 100h restricts the supply amount of the purge gas to the surge tank 34 controlled by the deceleration-fuel-cutoff purge valve controlling module 100d, based on the concentration of the evaporated fuel estimated by the evaporated fuel concentration estimating module 100f.

Also in the second map used by the purge restricting module 100h, similar to the first map (FIG. 4), the target A/F is not set for when the learned value indicates a concentration higher than a predetermined concentration, in other words, when the purge greatly influences the final excess fuel integration value. In such a case, the purge restricting module 100h prohibits the purge.

In this embodiment, as described above, the purge restricting module 100h restricts the purge based on the concentration of the evaporated fuel estimated by the evaporated fuel concentration estimating module 100f, so that the air-fuel ratio within the combustion chambers 6 of the engine 1 during the immediately previous deceleration fuel cutoff exceeds the predetermined ratio; however, the air-fuel ratio estimating module 100i may estimate the air-fuel ratio within the combustion chambers 6 of the engine 1 during the immediately previous deceleration fuel cutoff in the case where the purge is performed during the immediately previous deceleration fuel cutoff, and when the estimated air-fuel ratio is below a preset ratio, the air-fuel ratio estimating module 100i may prohibit the purge during the immediately previous deceleration fuel cutoff.

In this case, the air-fuel ratio estimating module 100i estimates the air-fuel ratio within the combustion chambers 6 of the engine 1 during the immediately previous deceleration fuel cutoff in the case where the purge is performed during the immediately previous deceleration fuel cutoff, to be the target A/F calculated based on the first map used by the deceleration-fuel-cutoff purge valve controlling module 100d. Also note that by taking into consideration the change amount of the air-fuel ratio caused by the duty control, the air-fuel ratio within the combustion chambers 6 is preferably estimated to be an air-fuel ratio obtained by subtracting, from the target A/F calculated based on the first map, a difference between an average value and a minimum value of the changed air-fuel ratios caused by the duty control. The preset ratio is set so that the final excess fuel integration value significantly reduces if the air-fuel ratio within the combustion chambers 6 falls below the preset ratio.

Figure 7:
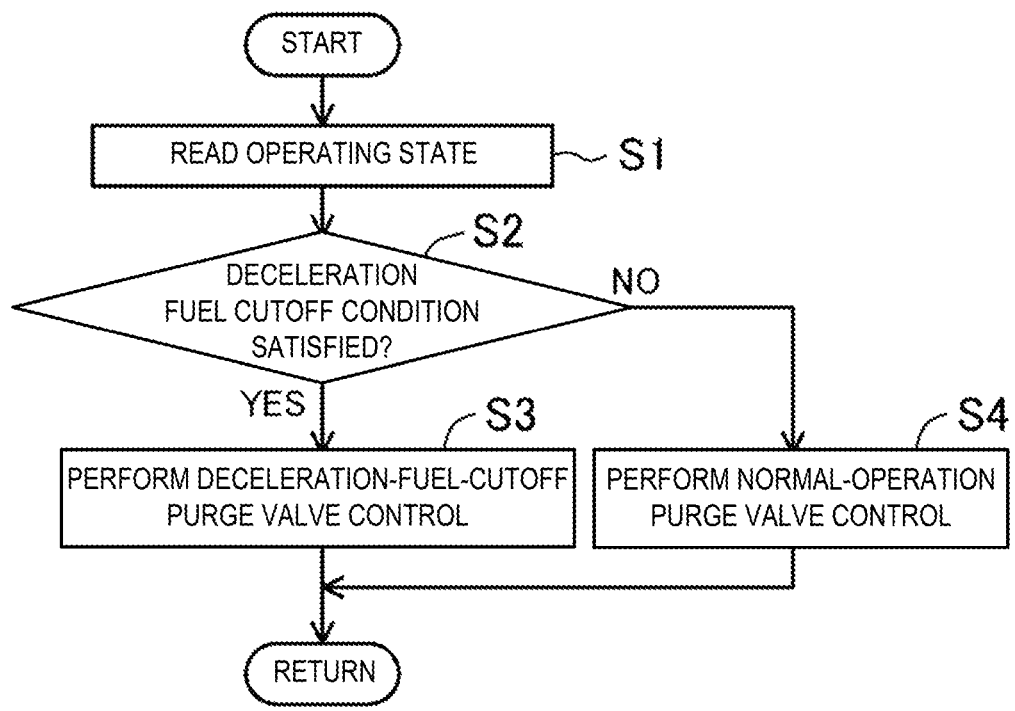
FIG. 7 is a flowchart illustrating a processing operation regarding the purge, performed by the control system.

Next, the processing operation regarding the purge performed by the control system 100 is described with reference to the flowchart in FIG. 7.

First, at S1, the operating state of the engine 1 is read, and then at S2, whether the deceleration fuel cutoff condition is satisfied is determined.

If the determination result of S2 is positive, the operation proceeds to S3 where the deceleration-fuel-cutoff purge valve control (the control of the purge valve 75 by the deceleration-fuel-cutoff purge valve controlling module 100d) is performed, then returns to the start of the operation.

On the other hand, if the determination result of S2 is negative, the operation proceeds to S4 where the normal-operation purge valve control (the control of the purge valve 75 by the normal-operation purge valve controlling module 100c) is performed, then returns to the start of the operation.

Figure 8:
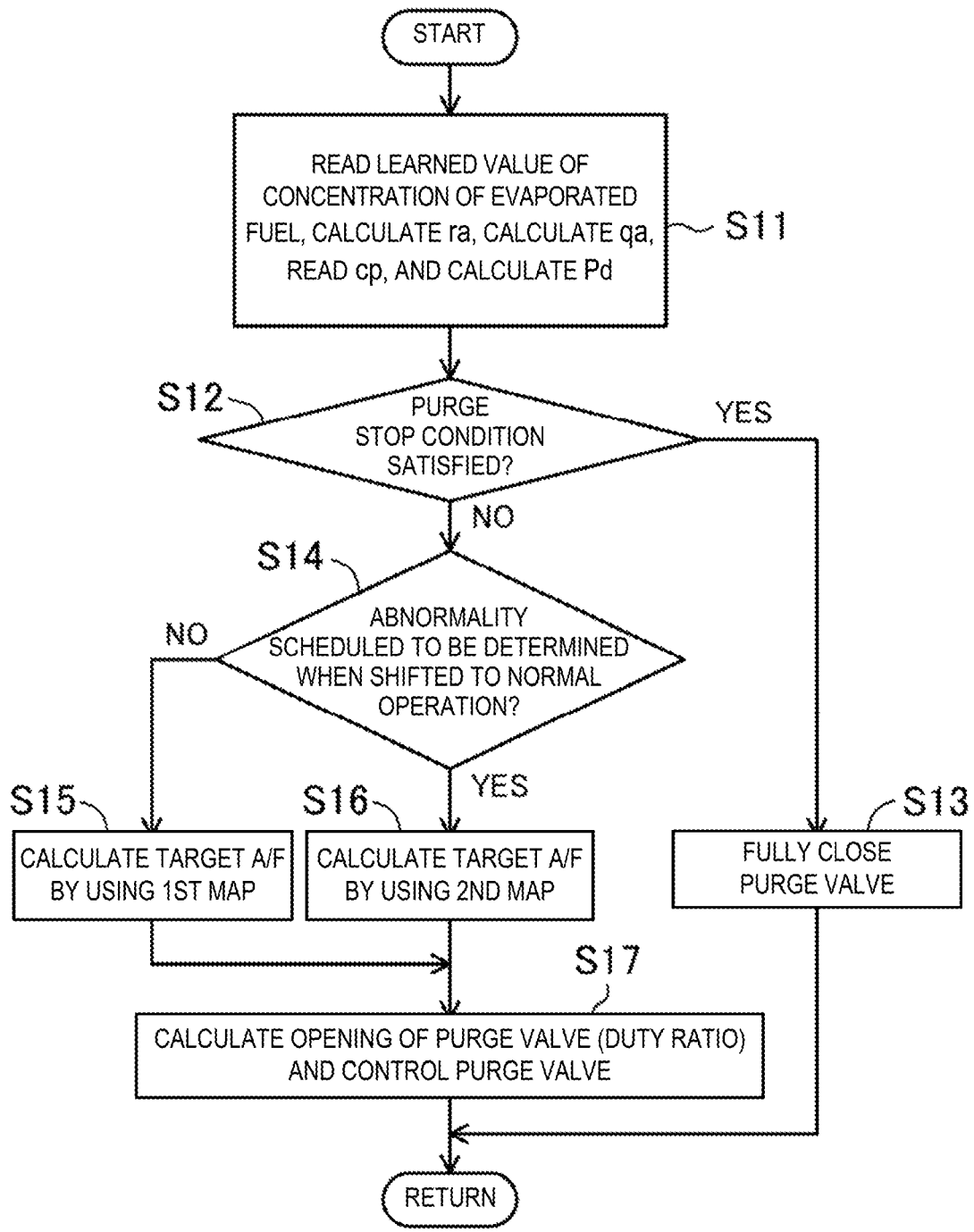
FIG. 8 is a flowchart illustrating a processing operation of a deceleration-fuel-cutoff purge valve control by the control system.

The processing operation of the deceleration-fuel-cutoff purge valve control at S3 is described more in detail with reference to the flowchart in FIG. 8.

First, at S11, the learned value of the concentration of the evaporated fuel is read from the memory 90, the mass ratio ra of the evaporated fuel with respect to the entirety of the purge gas is calculated based on the learned value, and the total air mass qa sucked into the combustion chambers 6 is calculated based on the output value of the airflow sensor 32, the mass ratio ra, and the output value of the linear $O_2$ sensor 55. Further, the density cp corresponding to the mass ratio ra is read from the memory 90, and the pressure difference Pd between the detected pressure by the pressure sensor 35 and the detected pressure by the atmospheric pressure sensor 91 is calculated.

Next at S12, whether a purge stop condition is satisfied is determined. The purge stop condition is, for example, a condition at which temperatures of the exhaust emission control catalysts 52 and 53 fall below predetermined temperatures when the purge is performed. The predetermined temperatures are set so that purifying performances of the exhaust emission control catalysts 52 and 53 significantly degrade when falling below the predetermined temperatures, respectively (e.g., they are equal or close to activation temperatures of the exhaust emission control catalysts 52 and 53). The temperatures of the exhaust emission control catalysts 52 and 53 may be detected by temperature sensors or estimated when the purge is performed.

If the determination result of S12 is positive, the operation proceeds to S13 where the purge valve 75 is fully closed, then returns to the start of the operation.

On the other hand, if the determination result of S12 is negative, the operation proceeds to S14, where it is determined whether or not the abnormality of the upstream exhaust emission control catalyst 52 is scheduled to be determined when the operation of the engine 1 is shifted from the current deceleration fuel cutoff to the normal operation (i.e. whether the current deceleration fuel cutoff is the immediately previous deceleration fuel cutoff). Any deceleration fuel cutoff performed may be the immediately previous deceleration fuel cutoff, and for example, the immediately previous deceleration fuel cutoff may be performed every time the deceleration fuel cutoff is performed a predetermined number of times.

If the determination result of S14 is negative, the operation proceeds to S15 where the target A/F (the target A/F during the deceleration fuel cutoff that is not the immediately previous deceleration fuel cutoff) is calculated based on the learned value by using the first map. Here, if the learned value indicates a concentration above the preset concentration C (the hatched section in FIG. 4), the purge is not performed (the purge valve 75 is fully closed). Then, the operation proceeds to S17.

On the other hand, if the determination result of S14 is positive, the operation proceeds to S16 where the target A/F (the target A/F during the immediately previous deceleration fuel cutoff) is calculated based on the learned value by using the second map. Here, if the learned value indicates a concentration above the predetermined concentration, the purge is not performed (the purge valve 75 is fully closed). Then, the operation proceeds to S17.

At S17, the purge gas volume qprg is calculated based on the target A/F set at one of S15 and S16, the mass ratio ra, the total air mass qa, and the density cp, the opening of the purge valve 75 (the duty ratio described above) is calculated based on the purge gas volume qprg and the pressure difference Pd, and the purge valve 75 is controlled to have the calculated opening. Then, the operation returns to the start of the operation.

The processing at S16 to which the operation proceeds when the determination result at S14 is positive, and the processing at S17 which follows S16, are performed by the purge restricting module 100h to restrict the purge so that the air-fuel ratio within the combustion chambers 6 of the engine 1 exceeds the predetermined ratio during the immediately previous deceleration fuel cutoff.

Note that the abnormality determining module 100g calculates the integration value of the total air mass qa during the immediately previous deceleration fuel cutoff, and when the integration value of the total air mass qa exceeds a predetermined mass during the immediately previous deceleration fuel cutoff, the abnormality determining module 100g determines that the stored oxygen amount in the upstream exhaust emission control catalyst 52 is increased to the saturated oxygen amount during the deceleration fuel cutoff.

Figure 9:
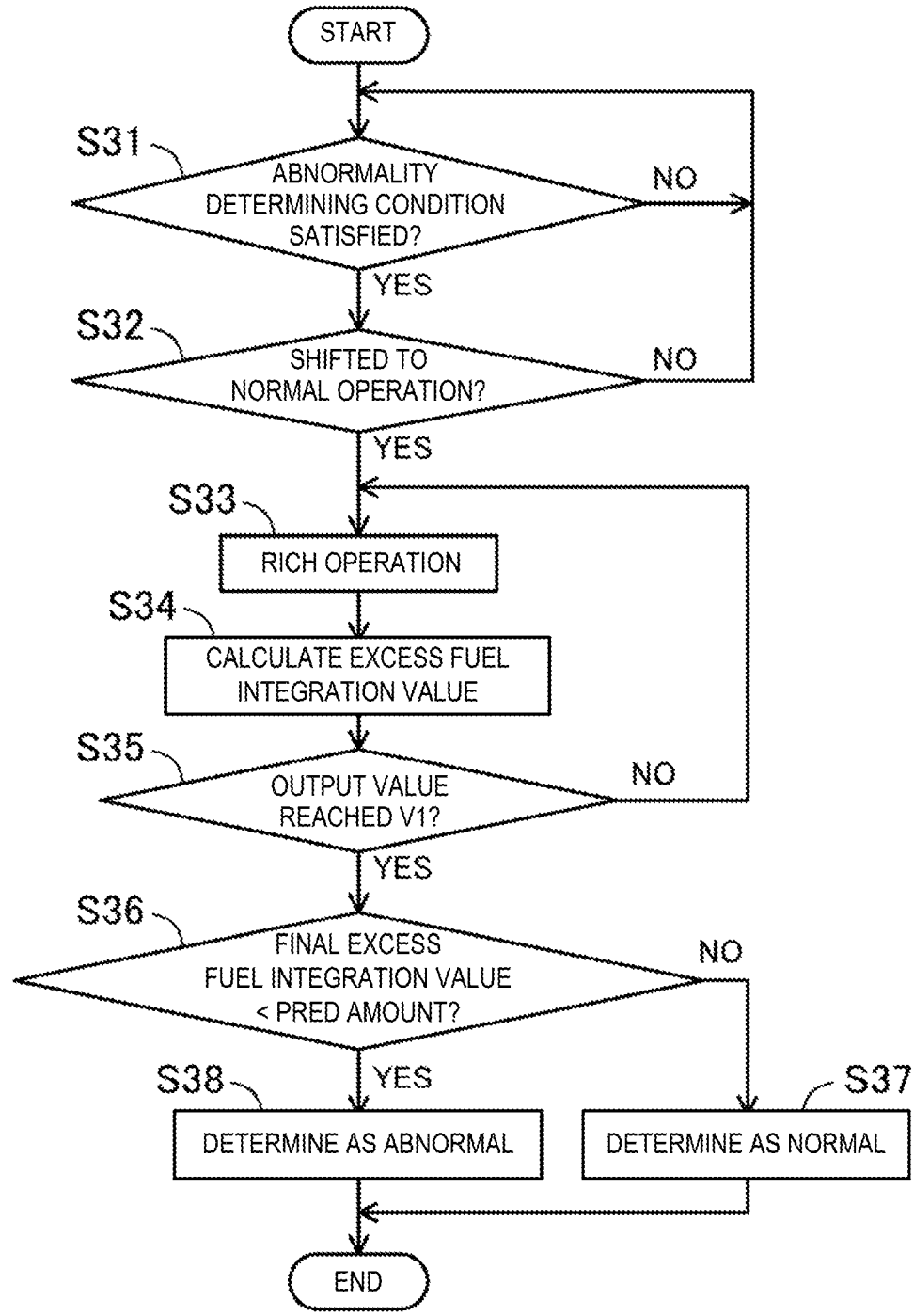
FIG. 9 is a flowchart illustrating a processing operation of determining an abnormality of the upstream exhaust emission control catalyst by the control system.

Next, the processing operation of the abnormality determination of the upstream exhaust emission control catalyst 52 performed by the control system 100 (abnormality determining module 100g) is described with reference to the flowchart in FIG. 9.

First at S31, whether an abnormality determining condition for determining the abnormality during the immediately previous deceleration fuel cutoff is satisfied is determined. The abnormality determining condition is a condition in which the output value of the $O_2$ sensor 56 during the immediately previous deceleration fuel cutoff is below the predetermined voltage V1 and the stored oxygen amount in the upstream exhaust emission control catalyst 52 is increased to the saturated oxygen amount during the immediately previous deceleration fuel cutoff.

If the determination result of S31 is negative, the determination at S31 is repeated, whereas if the determination result of S31 is positive, the operation proceeds to S32 where whether the operation of the engine 1 is shifted to the normal operation is determined.

If the determination result of S32 is negative, the operation returns to S31, whereas if the determination result of S32 is positive, the operation proceeds to S33 where the rich operation of the engine 1 is performed (the target air-fuel ratio is reduced from stoichiometric).

Next at S34, the excess fuel integration value is calculated, and then, at S35, whether the output value of the $O_2$ sensor 56 is increased to the predetermined voltage V1, or in other words, whether the output value of the $O_2$ sensor 56 is changed at least by the predetermined value, is determined. If the determination result of S35 is negative, the operation returns to S33, whereas if the determination result of S35 is positive, the operation proceeds to S36.

At S36, whether the final excess fuel integration value finally calculated when the output value of the $O_2$ sensor 56 reaches the predetermined voltage V1 is below the predetermined amount is determined. If the determination result of S36 is negative, the operation proceeds to S37 where the upstream exhaust emission control catalyst 52 is determined as normal, and then the processing operation of the abnormality determination is ended. On the other hand, if the determination result of S36 is positive, the operation proceeds to S38 where the upstream exhaust emission control catalyst 52 is determined as abnormal, and then the processing operation of the abnormality determination is ended.

Therefore, in this embodiment, the abnormality determination in which whether the upstream exhaust emission control catalyst 52 is abnormal is determined is performed based on the total amount of excess fuel with respect to the stoichiometric amount of fuel in the period from the shift of the engine operation from the deceleration fuel cutoff to the normal operation to the change of the output value of the $O_2$ sensor 56 at least by the predetermined value, and the purge is restricted during the immediately previous deceleration fuel cutoff which is performed immediately before the abnormality determination. Therefore, the degradation in accuracy of the abnormality determination of the upstream exhaust emission control catalyst 52 due to the purge during the immediately previous deceleration fuel cutoff can be suppressed.

The present invention is not limited to the above embodiment, and may be substituted without deviating from the scope of the claims.

The above-described embodiment is merely an illustration, and therefore, the present invention must not be interpreted in a limited way. The scope of the present invention is defined by the claims, and all modifications and changes falling under the equivalent range of the claims are within the scope of the present invention.

The present invention is useful for performing, with a control system of an engine in which the purge gas containing evaporated fuel desorbed from a canister is supplied to an intake passage, a purge during a deceleration fuel cutoff of the engine, and an abnormality determination in which whether an exhaust emission control catalyst is abnormal is determined based on a total amount of excess fuel with respect to a stoichiometric amount of fuel in a period from a shift of an operation of the engine from the deceleration fuel cutoff to a normal operation to a change of an output value of an $O_2$ sensor at least by a predetermined value.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

LIST OF REFERENCE CHARACTERS

1 Engine
30 Intake Passage
40 Exhaust Passage
52 Upstream Exhaust Emission Control Catalyst (Exhaust Emission Control Catalyst)
56 $O_2$ Sensor
70 Canister
73 Purge Tube (Purge Line) (Purge Unit)
75 Purge Valve (Purge Unit)
100d Deceleration-fuel-cutoff Purge Valve Controlling Module (Purge Valve Controlling Module) (Purge Unit)
100e Deceleration-fuel-cutoff Controlling Module (Deceleration Fuel Cutoff Module)
100f Evaporated Fuel Concentration Estimating Module
100g Abnormality Determining Module
100h Purge Restricting Module
100i Air-fuel Ratio Estimating Module

The invention claimed is:

1. A control system of an engine in which a purge gas containing evaporated fuel desorbed from a canister is supplied to an intake passage of the engine, the control system comprising:
a deceleration fuel cutoff module for performing a deceleration fuel cutoff to stop a fuel supply from an injector to the engine when a predetermined deceleration fuel cutoff condition is satisfied in a decelerating state of the engine;
a purge unit for purging by supplying the purge gas to the intake passage during the deceleration fuel cutoff;
an exhaust emission control catalyst provided in an exhaust passage of the engine;
an $O_2$ sensor provided at a position of the exhaust passage downstream of the exhaust emission control catalyst;
an abnormality determining module for determining an abnormality of the exhaust emission control catalyst by performing a rich operation of the engine when an operation of the engine is shifted from the deceleration fuel cutoff to a normal operation, calculating a total amount of excess fuel with respect to a stoichiometric amount of fuel in a period from the shift of the engine operation until an output value of the $O_2$ sensor changes by a predetermined value due to the rich operation of the engine, and determining whether the exhaust emission control catalyst is abnormal based on the total amount of the excess fuel, the normal operation performed to operate the engine by injecting the fuel from the injector to the engine and combusting the injected fuel; and
a purge restricting module for restricting the purge during an immediately previous deceleration fuel cutoff that is a deceleration fuel cutoff performed immediately before the abnormality determination.

2. The control system of claim 1, wherein during the immediately previous deceleration fuel cutoff, the purge restricting module restricts the purge so that an air-fuel ratio within a combustion chamber of the engine exceeds a predetermined ratio.

3. The control system of claim 1, further comprising an air-fuel ratio estimating module for estimating an air-fuel ratio within a combustion chamber of the engine during the immediately previous deceleration fuel cutoff for a case where the purge is performed by the purge unit during the immediately previous deceleration fuel cutoff,
wherein the purge restricting module prohibits the purge during the abnormality determination when the air-fuel ratio estimated by the air-fuel ratio estimating module is below a preset ratio.

4. The control system of claim 2, wherein the purge unit includes a purge line through which the canister communicates with the intake passage, a purge valve provided in the purge line, and a purge valve controlling module for controlling a supply amount of the purge gas to the intake passage by performing a duty control of the purge valve when the purge is performed,
the control system further comprising an evaporated fuel concentration estimating module for estimating a concentration of the evaporated fuel within the purge gas when the purge is performed by the purge unit during the immediately previous deceleration fuel cutoff,
wherein during the immediately previous deceleration fuel cutoff, the purge restricting module restricts the supply amount of the purge gas to the intake passage controlled by the purge valve controlling module, based on the estimated concentration of the evaporated fuel.

5. The control system of claim 4, wherein when the estimated concentration of the evaporated fuel is above a predetermined concentration, the purge restricting module prohibits the purge during the immediately previous deceleration fuel cutoff.

6. The control system of claim 3, wherein the purge unit includes a purge line through which the canister communicates with the intake passage, a purge valve provided in the purge line, and a purge valve controlling module for controlling a supply amount of the purge gas to the intake passage by performing a duty control of the purge valve when the purge is performed,
the control system further comprising an evaporated fuel concentration estimating module for estimating a concentration of the evaporated fuel within the purge gas when the purge is performed by the purge unit during the immediately previous deceleration fuel cutoff,
wherein during the immediately previous deceleration fuel cutoff, the purge restricting module restricts the supply amount of the purge gas to the intake passage controlled by the purge valve controlling module, based on the estimated concentration of the evaporated fuel.

7. The control system of claim 6, wherein when the estimated concentration of the evaporated fuel is above a predetermined concentration, the purge restricting module prohibits the purge during the immediately previous deceleration fuel cutoff.

* * * * *